2,798,060
POLYMERISATION OF ACRYLIC ESTERS WITH PEROXIDE CATALYST COPPER COMPOUND AND A MERCAPTIDE

Walter Louis Rawitzer, Harold Jacob Stern, and Lawrence Edward Shadbolt, London, England, assignors to Dental Fillings Limited, London, England, a British company No Drawing. Application September 15, 1953, Serial No. 380,342

Claims priority, application Great Britain September 30, 1952

10 Claims. (Cl. 260—45.5)

This invention is concerned with improvements in the polymerisation of esters of methacrylic acid and copolymers of such esters. More especially, this invention relates to polymerisable compositions containing such esters which are suitable for use in the dental field.

In the manufacture and repair of dental prostheses, crowns, fillings and the like, it is customary to employ a mixture of a liquid consisting substantially of a polymerisable monomer, with a solid polymer in a suitable fine state of division. It is usual practice to add a polymerisation inhibitor to the liquid polymerisable material to prevent premature polymerisation during storage. The said mixture forms a dough which may readily be moulded or formed to the desired shape, and which ultimately sets to a hard solid mass. This "set," involving polymerisation of the monomer component, is brought about by means of one or more catalysts which may be incorporated in the original liquid or solid component.

The speed at which polymerisation occurs is dependent upon a number of factors, including ratio of solid polymerisate to polymerisable liquid, the nature and particle size of the solid polymerisate, the nature and quality of accelerator employed and the temperature at which the polymerisation takes place. Using a conventional accelerator, such as benzoyl peroxide, it is necessary to use a temperature of e. g. 75° C. in order that the process shall be completed within a reasonable time. For certain applications, especially dental prostheses, this temperature is inconveniently high and various other accelerator systems, for example, per-compounds, such as benzoyl peroxide used in conjunction with tertiary amines, or sulphinic acids, have been proposed which cause polymerisation at about room temperature or body temperature. Such materials possess certain disadvantages; tertiary amines are liable to give rise to undesirable colours in the final product and the use of sulphinic acids is rendered cumbersome by reason of their instability.

According to the present invention, it has now been found that the polymerisation of stabilised monomeric methyl methacrylate in the presence of a finely divided polymer material consisting at least predominantly of methyl methacrylate polymer, can be brought about rapidly at room temperature or body temperature (viz. 37.5° C.) and without the aforesaid disadvantages by the use of a selected mercaptide as herein defined in conjunction with a peroxide catalyst and at least a trace of copper compound.

Metallic derivatives of aliphatic mercaptans may be prepared in several ways. One method is to treat the mercaptan with a metal. This method is applicable in the case of alkali metals which react directly with the mercaptan. For example, sodium and potassium mercaptides can readily be prepared in this way. A second method consists in treating a solution of the mercaptan in a suitable solvent, e. g. methyl alcohol, with a solution of the metallic salt of a weak acid, for example, the acetate. For example, by treating a solution of a mercaptan in methyl alcohol, with a solution of zinc acetate in methyl alcohol (the methyl alcohol containing a small amount of water) a zinc mercaptide salt is precipitated. A third method involves treating an alcoholic solution of the mercaptan with a solution of a metal salt in the presence of sodium acetate. For example, by treating a solution of a mercaptan in methyl alcohol with a solution of calcium chloride in methyl alcohol in the presence of sodium acetate, a calcium mercaptide is precipitated.

The number of mercaptides which can be used in carrying out the present invention is limited by several factors. Firstly it has not been found possible to prepare some certain metallic mercaptides, for example those of iron, cobalt and nickel by the methods hereinbefore described. Secondly, other mercaptides which can be so prepared are so unstable that they decompose rapidly and are hence unsuitable; an example is the copper salt of tertiary dodecyl mercaptan. Thirdly, even those mercaptides which can be prepared in a stable state, are not in all cases suitable for the present purpose. In particular, mercury and silver mercaptides retard or stop polymerisation.

In the result only a limited class of mercaptides has been found to possess the requisite properties of stability prior to incorporation in the polymerisation mix and of accelerating the rate of polymerisation in that mix. This class consists of the zinc, cadmium, lead, bismuth, alkaline earth metals such as calcium, and alkali metals such as sodium and potassium salts or complexes formed with tertiary aliphatic mercaptans. These mercaptide salts or complexes (including, in the case of the divalent metals, the half-mercaptides) are herein referred to generically as "mercaptides as herein defined."

It was similarly found that, in conjunction with the aforesaid mercaptides, the action of a copper catalyst is quite specific; for example many other trace metals such as iron, manganese, lead, nickel, bismuth, uranium and cobalt exerted no effect upon polymerisation in the presence of mercaptide while mercury and silver salts retarded or stopped polymerisation.

It will be appreciated that the useful effect of the mercaptide employed is dependent upon the interaction of the mercaptide with the peroxide catalyst also present in the polymerisation mix. It is important that the relative proportions of mercaptide and peroxide should be in balance; a preliminary test will serve in the case of any partcular combination of mercaptide and per-compound to determine the optimum relative proportions and minimum aggregate quantity necessary to bring about reaction of the components and therefore to produce the desired rate of polymerisation. Typical examples both of peroxides and mercaptides and of relative proportions of each are given hereinafter.

The speed of polymerisation may be further enhanced by the incorporation of methacrylic acid which readily undergoes polymerisation. The proportion of added acid will vary according to the other conditions employed but amounts of the order of 20% of total monomer component have proved to be beneficial.

The copper compound employed as auxiliary catalyst may be present in very small amount. Excess copper should be avoided especially for applications where significant discolouration of the product is undesirable. In general it is found that for satisfactory results the copper content per million, based upon the monomeric liquid constitutent, should not exceed 600 but amounts of the order of 40 to 50 are preferred. In cases where discolouration of product is not important, the copper content may, of course, be increased. Examples of copper compounds for use in the process are copper oxide, copper methacrylate and copper sulphate.

The relative proportions of finely divided polymer component and of liquid monomer component will vary according to the degree of viscosity required for the mixture. As to the monomer component, it is possible to employ in conjunction with methyl methacrylate other methacrylate monomers such as the ethyl, butyl, vinyl, diglycol and cyclohexyl compounds as well as other polymerisable monomers such as vinylidene chloride, vinyl acetate, acrylonitrile, styrene, chlorostyrene and alpha-methyl-styrene. The polymer component may similarly contain in addition to polymethyl methacrylate also copolymer products by incorporation of small quantities of other similar polymers such as other methacrylic polymers, polystyrene and polychlorostyrene.

The manner in which the various components of the monomer-polymer mixture are incorporated may be varied, having due regard to the possibility of premature reaction and to the desirability of keeping to the minimum the number of individual components to be mixed together at the time of use. Where, as is preferred, the mercaptide is obtainable as a crystalline solid it is conveniently incorporated in powder form into the solid polymer component. Since, however, the polymer compound normally contains peroxide catalyst, a slow interaction may occur with resultant loss of activity of the mercaptide. Accordingly, it may sometimes be preferred to utilise two powders, or solid components, with one liquid component, one powder consisting of a mixture of powdered polymer with peroxide and the other powder consisting of a mixture of powdered polymer with mercaptide. The liquid monomer component may contain a conventional stabiliser, such as hydroquinone and may also contain methacrylic acid. The trace amount of copper salt required is added either to the liquid or the powder. Fillers, colouring matter, etc. may be added to either of the powders.

As the mercaptides employed are stable to prolonged storage, the solid component containing the same may be kept without deterioration. Although for most purposes it is preferred to mix the solid mercaptide with one of the solid components, for some applications the mercaptide may be suspended in the liquid monomeric component.

The present invention is illustrated by the following examples:

*Example I*

2 parts of a polymer mixture consisting of polymethyl methacrylate (100), lauroyl peroxide (4), copper (.004), added as copper methacrylate, and the zinc derivative of tertiary hexadecyl mercaptan (3) are mixed with one part of a liquid consisting of 90 parts methyl methacrylate, and 10 parts methacrylic acid. Mixing is continued until a plastic dough is obtained. Setting, at a temperature of 37.5° C., takes place in 4 minutes.

*Example II*

1 part of a polymer mixture consisting of polymethyl methacrylate (100), lauroyl peroxide (8) and copper (.008) added as copper methacrylate, is mixed with one part of a mixture consisting of polymethyl methacrylate (100) and the zinc derivative of tertiary dodecyl mercaptan (6). 2 parts of this mixture are mixed with 1 part of methyl methacrylate monomer containing 40 parts per million of hydroquinone. At 37.5° C. the dough formed sets to a hard mass in about 5½ minutes.

*Example III*

1 part of a polymer mixture consisting of polymethyl methacrylate (100), benzoyl peroxide (8) and copper (.08) added as copper methacrylate, is mixed with 1 part of a mixture consisting of polymethyl methacrylate 100) and the cadmium derivative of tertiary hexadecyl mercaptan (2.5). 2 parts of this mixture are mixed with 1 part of methyl methacrylate monomer containing 40 parts per million of hydroquinone. The dough which is formed by mixing, sets in about 6 minutes at 40° C.

*Example IV*

4 parts of a mixture consisting of polymethyl methacrylate (100), lauroyl peroxide (5) and copper (.005), added as copper methacrylate, are mixed with 1 part of a mixture consisting of polymethyl methacrylate (85) and the cadmium derivative of tertiary dodecyl mercaptan (15). Two parts of this mixture are mixed with a monomeric component consisting of methyl methacrylate (80) and methacrylic acid (20). The dough, which is formed by mixing, sets in about 3½ minutes at 37.5° C.

*Example V*

2 parts of a mixture consisting of polymethyl methacrylate (100), lauroyl peroxide (4), and copper (.004) added as copper methacrylate, are mixed with 1 part of a dispersion formed by ball milling together methyl methacrylate (100) and the zinc derivative of tertiary dodecyl mercaptan (6). The dough which is formed by mixing, sets in about 7 minutes at room temperature (ca. 24.5° C.).

*Example VI*

2 parts of a mixture consisting of polymethyl methacrylate (100), lauroyl peroxide (4), copper (.004) added as copper methacrylate, and the bismuth derivative of tertiary dodecyl mercaptan (7) are mixed with 1 part of a monomeric material consisting of methyl methacrylate (80) and methacrylic acid (20). The dough which is formed by mixing sets in about 6½ minutes at 37.5° C.

*Example VII*

1 part of a mixture consisting of polymethyl methacrylate (100), lauroyl peroxide (8) and copper (.008) added as copper oleate, is mixed with 1 part of a mixture consisting of polymethyl methacrylate (100) and a calcium derivative of tertiary dodecyl mercaptan (6). 1 part of a monomeric material consisting of methyl methacrylate (80) and methacrylic acid (20) is mixed with 2 parts of this polymer mixture to form a workable dough, which sets in about 5½ minutes at 37.5° C.

*Example VIII*

2 parts of a mixture consisting of polymethyl methacrylate (100), lauroyl peroxide (4), copper (.004) added as copper methacrylate and the sodium derivative of tertiary dodecyl mercaptan (8) are mixed with a monomeric material consisting of methyl methacrylate (90), and methacrylic acid (10). The dough which is formed sets in about 5 minutes at 37.5° C.

*Example IX*

2 parts of a mixture consisting of polymethyl methacrylate (100), lauroyl peroxide (4), copper (.004) added as copper methacrylate and the potassium derivative of tertiary dodecyl mercaptan (7) are mixed with 1 part of a monomeric material consisting of methyl methacrylate (80) and methacrylic acid (20). The dough which is formed sets in about 5 minutes at 37.5° C.

*Example X*

2 parts of a mixture consisting of polymethyl methacrylate (100), lauroyl peroxide (4), copper (.004) added as copper methacrylate and the lead derivative of tertiary dodecyl mercaptan (8) are mixed with 1 part of a monomeric material consisting of methyl methacrylate (80) and methacrylic acid (20). The dough which is formed sets in about 6 minutes at 37.5° C.

*Example XI*

2 parts of a mixture consisting of polymethyl methacrylate (100), lauroyl peroxide (4), copper (.004) added as copper methacrylate and the zinc derivative of tertiary octyl mercaptan (2) are mixed with 1 part of a monomeric material consisting of methyl methacrylate (80) and methacrylic acid (20). The dough which is formed sets in about 4 minutes at 37.5° C.

*Example XII*

2 parts of a mixture consisting of polymethyl methacrylate (100), lauroyl peroxide (4), copper (.004) are mixed with 1 part of a dispersion formed by ball milling together methyl methacrylate (100) and the zinc derivative of tertiary butyl mercaptan (5). The dough which is formed sets in about 8 minutes at room temperature (ca. 24.5° C.).

We claim:

1. A process for the production of a rapidly polymerisable composition which comprises forming a mixture of liquid monomeric methyl methacrylate and a solid polymer comprising predominantly methyl methacrylate units in proportions to form a composition of dough-like consistency, the said mixture also containing a peroxide polymerisation catalyst, a copper compound, selected from the group consisting of copper salts and copper oxide, in an amount not exceeding 600 parts per million, methacrylic acid and a mercaptide selected from the group consisting of the zinc, cadmium, lead, bismuth, alkali earth metal and alkali metal salts formed with tertiary aliphatic mercaptans.

2. A process for the production of a rapidly polymerisable composition which comprises forming a mixture of liquid monomeric methyl methacrylate and a solid polymer comprising predominantly methyl methacrylate units in proportions to form a composition of dough-like consistency, the said mixture also containing benzoyl peroxide, a copper compound, selected from the group consisting of copper salts and copper oxide, in an amount not exceeding 600 parts per million, methacrylic acid and a mercaptide selected from the group consisting of the zinc, cadmium, lead, bismuth, alkali earth metal and alkali metal salts formed with tertiary aliphatic mercaptans.

3. A process for the production of a rapidly polymerisable composition which comprises forming a mixture of liquid monomeric methyl methacrylate and a solid polymer comprising predominantly methyl methacrylate units in proportions to form a composition of dough-like consistency, the said mixture also containing lauroyl peroxide, a copper compound, selected from the group consisting of copper salts and copper oxide, in an amount not exceeding 600 parts per million, methacrylic acid and a mercaptide selected from the group consisting of the zinc, cadmium, lead, bismuth, alkali earth metal and alkali metal salts formed with tertiary aliphatic mercaptans.

4. A process for the production of a rapidly polymerisable composition which comprises forming a mixture of liquid monomeric methyl methacrylate and a solid polymer comprising predominantly methyl methacrylate units in proportions to form a composition of dough-like consistency, the said mixture also containing a peroxide polymerisation catalyst, a copper compound, selected from the group consisting of copper salts and copper oxide, in an amount not exceeding 600 parts per million, methacrylic acid and zinc tertiary aliphatic mercaptide.

5. A process for the production of a rapidly polymerisable composition which comprises forming a mixture of liquid monomeric methyl methacrylate and a solid polymer comprising predominantly methyl methacrylate units in proportions to form a composition of dough-like consistency, the said mixture also containing a peroxide polymerisation catalyst, a copper compound, selected from the group consisting of copper salts and copper oxide, in an amount not exceeding 600 parts per million, methacrylic acid and cadmium tertiary aliphatic mercaptide.

6. A rapidly polymerisable composition which comprises liquid monomeric methyl methacrylate and a solid polymer comprising predominantly methyl methacrylate units in proportions to form a composition of dough-like consistency, the said mixture also containing a peroxide polymerisation catalyst, a copper compound, selected from the group consisting of copper salts and copper oxide, in an amount not exceeding 600 parts per million, methacrylic acid and a mercaptide selected from the group consisting of the zinc, cadmium, lead, bismuth, alkali earth metal and alkali metal salts formed with tertiary aliphatic mercaptans.

7. A rapidly polymerisable composition which comprises liquid monomeric methyl methacrylate and a solid polymer comprising predominantly methyl methacrylate units in proportions to form a composition of dough-like consistency, the said mixture also containing benzoyl peroxide, a copper compound, selected from the group consisting of copper salts and copper oxide, in an amount not exceeding 600 parts per million, methacrylic acid and a mercaptide selected from the group consisting of the zinc, lead, bismuth, alkali earth metal and alkali metal salts formed with tertiary aliphatic mercaptans.

8. A rapidly polymerisable composition which comprises liquid monomeric methyl methacrylate and a solid polymer comprising predominantly methyl methacrylate units in proportions to form a composition of dough-like consistency, the said mixture also containing lauroyl peroxide, a copper compound, selected from the group consisting of copper salts and copper oxide, in an amount not exceeding 600 parts per million, methacrylic acid and a mercaptide selected from the group consisting of the zinc, lead, bismuth, alkali earth metal and alkali metal salts formed with tertiary aliphatic mercaptans.

9. A rapidly polymerisable composition which comprises liquid monomeric methyl methacrylate and a solid polymer comprising predominantly methyl methacrylate units in proportions to form a composition of dough-like consistency, the said mixture also containing a peroxide polymerisation catalyst, a copper compound, selected from the group consisting of copper salts and copper oxide, in an amount not exceeding 600 parts per million, methacrylic acid and zinc tertiary aliphatic mercaptide.

10. A rapidly polymerisable composition which comprises liquid monomeric methyl methacrylate and a solid polymer comprising predominantly methyl methacrylate units in proportions to form a composition of dough-like consistency, the said mixture also containing a peroxide polymerisation catalyst, a copper compound, selected from the group consisting of copper salts and copper oxide, in an amount not exceeding 600 parts per million, methacrylic acid and cadmium tertiary aliphatic mercaptide.

References Cited in the file of this patent

UNITED STATES PATENTS

| | | |
|---|---|---|
| 2,380,475 | Stewart | July 31, 1945 |
| 2,558,139 | Knock et al. | June 26, 1951 |
| 2,567,803 | Costan et al. | Sept. 11, 1951 |
| 2,575,135 | Schulze et al. | Nov. 13, 1951 |